3,071,436
MANUFACTURE OF ALUMINA HYDROGEL
George L. Hervert, Downers Grove, and Herman S. Bloch, Skokie, Ill., assignors to Universal Oil Products Company, Des Plaines, Ill., a corporation of Delaware
No Drawing. Filed Aug. 29, 1960, Ser. No. 52,325
1 Claim. (Cl. 23—143)

The present invention relates to the production of alumina, and is specifically directed toward a novel and improved method for manufacturing an alumina hydrogel through the reaction of water with metallic aluminum in the presence of a mercury promoter. The utilization of the process of the present invention, as hereinafter set forth, eliminates many difficulties generally attendant the catalytic production of alumina by this general method.

Alumina, as porous aluminum oxide, either in an anhydrous form, or as an aluminum oxide hydrate, or aluminum hydroxide, is utilized extensively throughout the chemical and petroleum industries. Alumina is employed as a dehydrating, treating or purifying agent, and is often combined with other refractory inorganic oxdies including silica, magnesia, thoria, boria, zirconia, titania, and mixtures of the same, etc. Modifications of the previously mentioned forms of alumina are known as activated alumina, or activated alumina of commerce, and are especially employed for their pronounced catalytic activity and adsorptive capacity.

Alumina, or aluminum hydrate, is present in various combined modifications; these modifications are commonly referred to as alpha-alumina, beta-alumina, epsilon-alumina, eta-alumina, and gamma-alumina: In addition, they may be designated as bayerite, boehmite and gibbsite, etc. Whatever form of alumina is utilized and whatever its intended use, it is often necessary that the alumina be substantially completely pure and especially free from contaminants which, if present, might induce adverse effects toward the particular function which is intended. A high degree of purity is particularly required in those instances wherein the alumina is to be utilized either as a catalyst in and of itself, or as a catalytically active carrier material for other catalytic components. An object of the present invention is to produce an alumina of high purity which is especially suitable for utilization as the carrier material for other catalytically active metallic components.

It is recognized that the art teaches the formation of alumina on the surface of metallic aluminum upon exposure of the latter to moist air or oxygen; this surface coating of alumina is always referred to as a protective coating, preventing the metallic aluminum under the coating from further converson to aluminum oxide. This protective coating of alumina is taught to be of a tenacious nature such that it adheres to the aluminum metal, and regardless of its thickness, is difficult to separate therefrom. In our invention, the alumina is produced detached from the aluminum, and is easily recovered. One common method of producing alumina is by purifying ores in which aluminum oxide is present. Another method involves the precipitation of aluminum hydroxide from a variety of aluminum salts. The preparation of alumina, as practiced at present, involves the addition of an alkaline reagent to a soluble aluminum salt such as aluminum chloride hexahydrate. The resultant precipitate requires many washing and filtering operations to remove undesirable impurities and contaminants. The utilization of alumina, as the catalytically active carrier material, requires that the alumina, comprising a major proportion of the catalyst, be thoroughly washed to remove undesirable impurities, since the presence of even small amounts of impurities may prove detrimental to the activity, and other properties of the catalyst, thereby destroying its intended function. Thus, for example, when the catalyst contains about 0.1% to about 1.0% by weight of activating components, the presence of impurities within a similar, or even lesser range, will tend to mask, or offset the effect of the activating components. The present invention offers a novel method for preparing an alumina hydrogel, eliminating the need for washing and filtering, and thereby reducing the time and expense heretofore required to produce high purity alumina.

Under particular conditions of temperature and pressure, alumina may be produced by initially reacting substantially pure metallic aluminum with water in the presence of a catalyst such as an organic acid, amines, or mercury and its compounds. Of these various catalytic methods, we have found that the utilization of a mercury promoter, as the catalyst, produces the most satisfactory alumina hydrogel. However, when reacting aluminum metal with water in the presence of a mercury promoter, two processing difficulties become prevalent. In the first instance, there exists the tendency for mercury to become entrained with the alumina hydrogel, carrying over with the latter upon its removal from the reaction zone. Secondly, metallic aluminum is removed from the reaction zone prior to its reaction with the water. Thus, another object of the present invention is to provide a process for the production of an alumina hydrogel, involving the reaction of metallic aluminum and water, while eliminating the carry-over difficulties hereinabove described.

In a broad embodiment, therefore, the present invention involves a process for producing an alumina hydrogel which comprises forming a reaction mixture consisting essentially of metallic aluminum, water and a mercury promoter, initiating the formation of an aluminum-mercury amalgam and alumina within a confined reaction zone, removing hydrogen from the resultant reaction mixture, adding metallic aluminum to said reaction mixture at a rate responsive to the rate of hydrogen removal, and withdrawing a substantially pure alumina hydrogel from the reaction mixture.

A more limited embodiment of the present invention is directed toward the continuous production of an alumina hydrogel through the method which comprises forming a reaction mixture consisting essentially of metallic aluminum, water and a mercury promoter, maintaining said mixture at a temperature within the range of from about 30° F. to about 250° F. and under a pressure sufficient to maintain water in the liquid phase within a reaction zone, initiating therein the formation of an aluminum-mercury amalgam and alumina, removing hydrogen from the resultant reaction mixture, adding metallic aluminum to said reaction mixture at a rate responsive to the rate of hydrogen removal, and withdrawing a substantially pure alumina hydrogel from the reaction mixture.

As hereinabove set forth, the present invention is directed toward the process of reacting metallic aluminum with water in the presence of a mercury promoter. During the initial phase of such a process, there exists a so-called induction period, the latter being defined as that time during which free aluminum and mercury exist prior to the formation of the aluminum-mercury amalgam following such induction period. The amalgamation period may, therefore, be defined as that interval in which an excess of free aluminum and mercury do not exist within the reaction zone. When the aluminum-mercury amalgam is formed, it settles as a heavy liquid to the bottom of the reaction zone, and, therefore, the undesirable carry-over of the amalgam with the alumina-hydrogel product is prevented. Similarly, the carry-over of metallic aluminum may be prevented. An essential feature of the present invention is the introduction of metallic aluminum during the amalgamation period such that only one induction period is necessary; that is, the only induction period experienced is that one which occurs during the initial start-up phase of the process. Additional metallic aluminum is added to the reaction zone during the amalgamation period such that there exists only the single induction period, rather than a series thereof as aluminum is consumed within the process, and aluminum metal is added.

Following the formation of the aluminum-mercury amalgam, the reaction between metallic aluminum and water proceeds quite readily, the reaction products of the aluminum and water being alumina plus hydrogen. In order to effect a process which has no mercury carryover, it is necessary to provide means for keeping the aluminum and mercury continuously in the form of the amalgam. Our invention provides that the rate of hydrogen evolution from the confined reaction zone be measured and maintained substantially constant, and that the rate of addition of metallic aluminum to the reaction zone be regulated in response to the rate of hydrogen production. The addition of metallic aluminum, responsive to hydrogen production, produces the desired result that the aluminum added becomes rapidly amalgamated resulting in the elimination of excessive free aluminum which tends to carry over as an impurity with the alumina hydrogel product.

The novelty and utility of the present invention is not intended to be limited to a particular method and/or means for measuring the hydrogen production rate, and for maintaining the same substantially constant. The rate of hydrogen removal from the reaction zone may be readily maintained and controlled through the installation of a back-pressure valve and pressure recorder-controller. The rate of hydrogen removal may be measured by the installation of a suitable orifice in the outlet line, accompanied by a manometer-type indicating instrument connected across the orifice installation. The hydrogen measuring and controlling means is connected, either electrically, or by a suitable pressure-differential device, to additional means which controls the quantity of metallic aluminum introduced into the reaction zone. That is, a decrease in the hydrogen production rate will automatically effect an increase in the rate of aluminum added to the reaction zone, and correspondingly, an increase in the quantity of hydrogen produced, will result in a reduction in the rate of the aluminum being introduced into the reaction zone. By this method, the effluent slurry of alumina hydrogel is continuously withdrawn containing a minimum quantity of entrained mercury and aluminum as impurities.

Through the process of our invention, alumina may be prepared through the interaction of water and aluminum, in the absence of an acid or other added electrolyte, and hydrogen, in a very pure state, is produced as a by-product. Our method is further superior in that the alumina is prepared directly as a hydrogel, rather than as an alumina hydrosol as is produced by other, multi-step processes. The alumina hydrogel, produced by the method of the present invention, requires only drying and calcining treatments to be converted to the preferred form of pure, dry gamma-alumina. The alumina hydrogel is produced either as a hydrogel, or as crystals of alumina. At temperatures of from about 30° F. to about 400° F., alumina hydrogel of the bayerite modification is favored, while at temperatures of from about 400° F. to about 705° F., crystals of alumina corresponding to boehmite are usually produced. The preferred limits of temperature at which the alumina hydrogel is produced, are from about 30° F. to about 400° F. Lower temperatures may be employed, and a particularly preferred range is from about 30° F. to about 250° F. The metallic aluminum, to be utilized in our process, can be any substantially pure aluminum, although, if a high-purity alumina product is desired, it is preferably to start with high-purity aluminum. However, it is also within the scope of this invention to utilize certain aluminum alloys; on the other hand, since the present process will produce a very pure alumina, it is a preferred embodiment to react aluminum of 99.5+% purity with water to produce the high-purity alumina product. The presence of some alloying metals is undesirable, since they appear to inhibit the reaction of aluminum with water. The degree of subdivision of aluminum is a factor which determines the rate of the reaction. The smaller the size of the particles, the greater the surface area of aluminum exposed for reaction with the water; the use of powdered aluminum is, therefore, excellent in this respect. Granulated or pelleted aluminum, or aluminum in ribbon form is also suitable; however, the larger the particle size of the aluminum metal, the longer the time required for complete reaction. In general, particles of not more than about 1-inch in the greatest dimension are satisfactory, although those of about one-half inch average size are preferred. The epsilon-alumina, which forms rapidly on aluminum surfaces, and acts as a coating which normally passivates aluminum, does not effectively inhibit the reaction under the conditions hereinbefore disclosed. Aluminum pellets prepared by dropping molten aluminum into water have proven very satisfactory in the process of our invention.

The first step of the present invention comprises agitating the aluminum and water, along with the catalytic substance, so that the reaction proceeds at a desirable rate. The reaction velocity is dependent upon the temperature of the reactants, the degree of subdivision of the aluminum metal, the concentration or amount of the mercury promoter, and the degree of agitation given the mixture. Thus, a reaction which proceeds slowly at a temperature of about 212° F., with only a mild agitation or shaking of the mixture, will proceed very rapidly if the mixture is vigorously agitated. At a temperature of about 400° F., on the other hand, the reaction proceeds relatively rapidly even with a mild degree of agitation. However, if the mixture is subjected to vigorous agitation, the time necessary for complete reaction is substantially decreased.

One of the essential features of the present invention is that liquid water be present, and it is necessary, when employing temperatures above the normal boiling point of water, to effect the reaction under sufficient pressure to maintain a liquid phase of water. The critical temperature of water is 705.2° F.; the definition of the critical temperature being that temperature above which a gas cannot be liquefied by pressure alone. The use of liquid water is desirable since it is much easier to achieve intimate contact and mixing between the metallic aluminum and water if there exists a liquid phase. As previously set forth, the preferred temperature range is from about 30° F. to about 250° F.

The mercury promoter employed in the process of the present invention is not consumed, but produces an intermediate product known in the art as an amalgam. The formation of the amalgam, which is the product of aluminum and mercury, is of great importance in this process since it has been shown that the existence thereof will reduce the quantity of aluminum and mercury carryover in the alumina hydrogel product to a negligible quantity. The catalytic substance employed in this reaction is a mercury promoter, and is selected from the group consisting of mercury and compounds thereof. The promoter acts as an accelerant to speed the reaction of aluminum with water in order to form the desired alumina product. As an example, if 18 grams of aluminum and 500 grams of water are vigorously stirred at 212° F., and atmospheric pressure, the time required is approximately 168 hours for substantial reaction. When approximately 3.0% of mercuric oxide, based upon the weight of metallic aluminum, is added to the mixture, approximately six hours is required to achieve the same percent of reaction. We have found that the mercury compound reacts with the aluminum and is reduced to metallic mercury which then appears to amalgamate with the aluminum, spreading rapidly over the surface of the latter. There exists a difference in the catalytic effect of the various compounds of mercury, and it seems likely that the distribution of the mercury amalgam centers (which are probably cathodic) is an important factor in determining the reaction velocity. It is not intended, however, to limit unduly the method of our invention to this theory. A comparison between the speed of the reaction when metallic mercury is used as a promoter, and a proportional amount of a mercury compound, indicates some advantages for the mercury compound, although metallic mercury is itself quite effective. A preferred step of the present invention is the reaction of aluminum with water in the presence of a mercury promoter which may be mercury and/or a mercury compound such as mercuric oxide. When mercuric oxide or some other mercury compound or mercury is used as a catalyst in this reaction, the reaction will proceed at a much lower temperature than if the substances were absent. Further, in the presence of the mercury or mercuric compounds, aluminum alloys which are inert to the reaction of water alone, even at elevated temperatures, readily react at relatively mild temperatures. Since the mercury promoter acts as an accelerant, it is preferably employed in very low concentrations. Any amount of a mercury-containing material used as an accelerant or catalyst herein mentioned will be a catalytic amount or referred to as a catalytic amount. The concentration of the promoter would usually be within the range of from about 0.01% to about 50.0% by weight of the metallic aluminum present in the reactor at any time.

The mercury promoter is selected from the following groups, and may be a mixture of two or more: mercury, mercuric acetate, mercurous acetate, mercuric benzoate, mercuric bromate, mercurous bromate, mercuric bromide, mercurous bromide, mercuric iodide, mercurous carbonate, mercuric chlorate, mercuric chloride, mercurous chloride, mercuric fluoride, mercurous fluoride, mercuric iodide, mercuric nitrate, mercurous nitrate, mercuric oxalate, mercuric oxide, mercurous oxide, mercuric sulfate, mercurous sulfate, etc. as well as mercury-nitrogen compounds such as amino-basic mercuric bromide, amino-basic mercuric chloride, complexes of mercury compounds, etc. It is understood that the mercury compounds listed do not necessarily yield equivalent results, and the above listing should not be interpreted as unduly limiting the process of the present invention.

That it is preferable to utilize a liquid phase of water has already been established; the upper limit of temperature at which the reaction may proceed is, therefore, the critical temperature of water, or about 705° F. As hereinbefore stated, alumina hydrogel is favored over crystals of alumina, at temperatures from about 30° F. to about 400° F. The reaction requires increasingly longer periods of time as the temperature of the reaction is decreased and, where the time of the reaction is not important, it is possible to effect the reaction at a temperature down to the freezing point of the water and promoter solution, that is, about 32° F. or lower, although the reaction is quite slow at such low temperatures. Lower temperatures are utilized, for the purpose of increasing the quantity of the bayerite modification of alumina produced, and such temperatures lie within the range of from about 30° F. to about 250° F. Following its withdrawal from the reaction zone, the alumina hydrogel may be dried at a temperature within the range of about 200° F. to about 600° F. It is essential that the alumina hydrogel produced is not further contacted with hot water prior to the drying and calcining operations whereby the bayerite modification of alumina is transformed into gamma-alumina. Following the drying operation, therefore, it is preferred to subject the alumina to an immediate calcination treatment effected at an elevated temperature of from about 600° F. to about 1600° F. The calcined alumina is suitable either as a catalyst within itself, or as a catalytically active carrier material for other catalytic components. The alumina may be employed to serve any of the functions previously described; it may be utilized as rough granules, or it may be ground for use as a powder, or ground with a suitable lubricant and formed into pills or pellets.

The reaction may be effected in any suitable type of equipment wherein the reactants may be subject to agitation, and preferably to vigorous stirring, and may be effected in a continuous or batch-wise fashion. In our process, the aluminum metal is added continuously, in response to the rate of hydrogen production, and, therefore, the process is readily adaptable to the continuous production of an alumina hydrogel. When temperatures exceeding the normal boiling point of water are employed, it is necessary to effect the reaction in a vessel capable of withstanding pressure sufficient to maintain a liquid phase of water. In small scale production of alumina by this process, a rotating pressure-autoclave is satisfactory, which type of apparatus keeps the reactants and catalyst in a continual state of agitation by means of a sprocket attached to a shaft extended from the bottom of the rotary digester. The process equipment should necessarily be constructed of such materials that are not adversely affected by water or aluminum and/or the mercury promotors employed, so that undesirable elements are not introduced into the alumina hydrogel product.

The following examples are given to illustrate further the process of the present invention, and to indicate the benefits afforded through the utilization thereof. It is understood that the present invention is not to be limited unduly to the conditions, reagents and/or concentrations employed within these examples.

*Example I*

A rotary-kiln type digester, having a total capacity of 8070 milliliters, was filled with approximately 3585 milliliters of distilled water. The rotation of the rotary digester was started, and a temperature of 96° C., a pressure of 2 inches of water, and a rotation speed of 5 r.p.m. was imposed thereupon. An initial charge of 200 grams of aluminum metal (99.9% purity) was then added to the digester. Thereafter, aluminum metal was added at the rate of about 40 grams every one and one-half hours. At the time of the addition of the initial aluminum to the digester, 30 grams of mercury were introduced therewith. An alumina slurry was continuously extracted from the rotary digester, and upon analysis, was found to contain 149 milligrams of mercury per 100 milliliters thereof.

*Example II*

The following procedure was effected at the same conditions as previously set forth in Example I, with the exception, however, that the aluminum addition was automatically made responsive to the rate of hydrogen production; the evolution of hydrogen was controlled at a rate of about 4.0 s.c.f./hr. The aluminum addition was accomplished through the utilization of an orifice meter measuring the hydrogen production and operating a variable speed motor which, in turn, operated a screw-type conveyor feeding aluminum metal into the rotary digester. The alumina hydrogel slurry was again removed continuously, and, upon analysis, was found to contain 49 milligrams of mercury per 100 milliliters thereof.

The foregoing specification and examples clearly indicate the benefits to be afforded the continuous production of an alumina hydrogel through the utilization of the method of the present invention. The addition of the metallic aluminum, and the response to the rate of hydrogen evolution, has been shown to result in a virtual three-fold decrease in the quantity of mercury entrained within the alumina hydrogel removed from the reaction zone. It is evident that a further reduction in the mercury carry-over can be readily achieved through the utilization of more accurate means for measuring and controlling the hydrogen production rate, and the rate of aluminum addition, than those means heretofore employed for the purposes of illustration. Other relatively simple modifications may be made to the present process, by those possessing skill within the art, without removing such modified process from the scope and spirit of the appended claim.

We claim as our invention:

In the production of alumina hydrogel by the reaction of metallic aluminum and water at a temperature of from about 30° to about 705° F. in the presence of a mercury promoter in a reaction zone, thereby forming alumina and hydrogen, said reaction including an amalgamation period forming an aluminum-mercury amalgam, the improvement which comprises removing hydrogen from said zone at a substantially constant rate and introducing metallic aluminum to the reaction zone during said amalgamation period at a rate responsive to the rate of hydrogen production, the rate of aluminum addition being increased with decreasing hydrogen production rate and being decreased with increasing hydrogen production rate.

References Cited in the file of this patent

UNITED STATES PATENTS

| | | |
|---|---|---|
| Re. 22,196 | Heard | Oct. 6, 1942 |
| 2,449,847 | Heard | Sept. 21, 1948 |
| 2,643,935 | Halversen | June 30, 1953 |
| 2,686,159 | Webb et al. | Aug. 10, 1954 |
| 2,746,842 | Block et al. | May 22, 1956 |